United States Patent Office 2,853,378
Patented Sept. 23, 1958

2,853,378

TREATMENT OF LEAD

Edwin L. Mattison, Newark, Del., and Bernard N. Harris, Landenberg, Pa., assignors to E. I. du Pont de Nemours and Company, Wilmington, Del., a corporation of Delaware No Drawing. Application August 19, 1957
Serial No. 679,096

6 Claims. (Cl. 75—78)

This invention relates to the treatment of lead contaminated with sulfur compounds, particularly to the treatment of lead recovered from the manufacture of tetraethyllead so as to reduce the amount of sulfur compounds contained therein.

In the commercial process for manufacturing tetraethyllead, lead-sodium alloy is reacted with an excess of ethyl chloride in which the reaction may be represented by the following equation:

$$4NaPb + 4C_2H_5Cl \rightarrow Pb(C_2H_5)_4 + 4NaCl + 3Pb$$

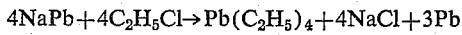

At least 75% of the lead is converted to by-product metallic lead which, for practical economical operation, must be recovered as completely as possible for reuse in the process. Ordinarily, most of the excess ethyl chloride is distilled from the reaction mass which is then drowned in water and subjected to steam distillation to remove the remaining ethyl chloride and the tetraethyllead as completely as possible in the distillate, leaving the by-product metallic lead in finely divided form suspended in an aqueous solution of sodium chloride.

During the steam distillation, the particles of metallic lead have a serious tendency to agglomerate into large balls and lumps. Therefore, it is common practice to add to the aqueous mixture prior to and/or during the steam distillation still aids which prevent the agglomeration of the lead particles during the steam distillation. Water-soluble alkali metal chromates, water-soluble alkali metal thiosulfates, and water-soluble iron compounds such as ferric chloride are common still aids. The alkali metal thiosulfates are most commonly employed, usually in combination with ferric chloride. Alkali metal sulfides are sometimes present in the lead-sodium alloy used in the reaction with ethyl chloride, particularly when the alloy is made from recovered lead. However, during such steam distillation, the alkali metal sulfides and thiosulfates react to produce water-insoluble sulfur-containing compounds of lead and of iron when iron compounds are present, particularly lead and iron sulfides and thiosulfates. Also, during the steam distillation, the metallic lead particles become coated with lead oxide.

After the steam distillation is completed, the aqueous salt suspension is conveyed to a sludge pit where it is allowed to settle, the aqueous salt solution drawn off, the wet sludge washed with water to remove most of the salt, and then dried to remove most of the water. The dried sludge contains the metallic lead, lead oxide, lead sulfide or thiosulfate and, when iron compounds are present during the steam distillation, iron sulfide or thiosulfate.

Commercially, the impure dried sludge is melted in a reverberatory furnace at temperatures of from 700° C. to about 900° C., producing an overlying solid slag layer and a lower layer of molten metallic lead. The molten lead is tapped off and cast into molds as cast lead "hogs." The slag consists mainly of lead oxide mixed with minor proportions of metallic lead, lead sulfide and sulfite produced in part by the reducing action of the combustion gases in the furnace, other lead salts, sodium chloride and (when iron compounds are present in the lead sludge) iron sulfide and sulfite and possibly other iron salts. Such impurities, though mainly concentrated in the slag, have small but definite solubilities in the hot molten metallic lead and some may be occluded in the molten lead.

When cast into molds and allowed to cool, the metallic lead gives up some of these impurities in the form of a semi-plastic solid dross amounting to about 0.8% of the cast lead and coating the surface of the cast metallic lead. This dross consists mainly of metallic lead, normally 75% to 85% by weight but may be up to about 95%, about 3% to about 15% by weight of sulfides calculated as lead sulfide and the remainder being mostly lead oxide and traces of other impurities. When iron is present in the dross, it may constitute from about 0.01% to about 1.5%, probably as its sulfide. This dross is skimmed off from the metallic lead and requires additional separate refining to recover the lead values therein, which additional refining has been costly.

Even after such refining treatments, including separation of the dross, the recovered metallic lead still contains small but definite quantities of most of the constituents of the dross, which remain dissolved and/or physically dispersed or occluded in the metallic lead and contaminate it. Lead sulfide constitutes the major contaminant, amounting to as high as 0.1% by weight and normally averaging about 0.075%. Lead sulfite generally averages about 0.01%, lead oxide up to about 0.025%, and lead carbonate in trace quantities. Also, when iron compounds are used in the tetraethyllead process, the recovered metallic lead may contain trace amounts of iron compounds.

For the manufacture of tetraethyllead, metallic lead is alloyed with metallic sodium, normally to form lead-monosodium alloy whose sodium content theoretically should be 10.00% by weight. However, it has been found that, when the recovered lead above described is so used, a portion of the sodium reacts with the sulfides and sulfites contained in the lead to form compounds which do not yield tetraethyllead on reaction with ethyl chloride. Therefore, in order to produce a satisfactory lead-monosodium alloy from such recovered lead, it has been necessary to employ 10.04% by weight of sodium. While the additional quantity of sodium so required appears to be small in proportion, economically it is substantial and important in the large scale commercial manufacture of tetraethyllead.

It is an object of this invention to provide a process for treating metallic lead which contains small amounts of impurities consisting mainly of lead sulfide to materially reduce the amount of the sulfur compounds therein. It is a particular object to provide such a process wherein the metallic lead is recovered lead from the manufacture of tetraethyllead and is rendered more satisfactory for the production of lead-sodium alloy to be used in the manufacture of tetraethyllead. A further object is to improve the refining of lead obtained as a by-product in the manufacture of tetraethyllead whereby significant economies are obtained. Other objects are to advance the art. Still other objects will appear hereinafter.

The above and other objects may be attained by this invention which comprises the treatment of lead which is contaminated with from about 0.05% to about 15% by weight of impurities which consist mainly of lead sulfide by maintaining said lead at a temperature of from about 330° C. to about 650° C. while intimately contacting it with a member of the group consisting of hydrogen chloride and ammonium chloride in excess of that theoretically required to convert all of the sulfur compounds therein to chlorides and until said sulfur compounds are largely so converted.

It has been found that hydrogen chloride rapidly reacts with those sulfur compounds at temperatures of about 330° C. and above to convert them to products, usually to chlorides, which are innocuous or are readily removed from the lead. Thereby, the amounts of the objectionable sulfur compounds in the lead are rapidly and effectively reduced to a negligible and substantially innocuous level. For example, lead sulfide and lead sulfite, respectively, are converted to lead chloride according to the following equations:

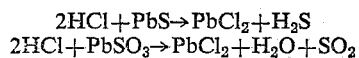

$$2HCl + PbS \rightarrow PbCl_2 + H_2S$$
$$2HCl + PbSO_3 \rightarrow PbCl_2 + H_2O + SO_2$$

Under the conditions of the process, the $H_2S$, $H_2O$ and $SO_2$ are volatile and readily and rapidly pass out of the lead in the off gases wherein they are readily detected by conventional means to readily and conveniently determine the extent and completeness of the reaction. Most of the metal chlorides, i. e. lead and iron chlorides, produced separate from the lead as part of the dross. The metal chlorides remaining in the lead are unobjectionable; that is, in the amounts produced, they exert no deleterious effect on the behavior of the lead so treated in its subsequent conversions into lead-sodium alloy and thence to tetraethyllead. Simultaneously, lead and iron carbonates and oxides which may be present in the lead are converted to the metal chlorides with the evolution of $CO_2$ or water.

This invention is particularly adapted to the treatment of conventionally recovered lead from the manufacture of tetraethyllead as hereinbefore described, that is, the impure lead obtained from the reverberatory furnace. Such impure lead, including the dross-forming impurities, contains sulfur compounds (calculated as lead sulfide) up to about 0.2%. The recovered lead may be treated before or during the formation of the dross, after the formation of the dross, or after removal of the dross which then may be separately treated by the process of this invention. However, the process can be applied to lead of the indicated composition obtained from any other source.

Lead melts at about 327° C. In the process of this invention, the lead should be maintained at a temperature in the range of from about 330° C. to about 650° C. At temperatures materially above 650° C., the hydrogen chloride tends to also react with the metallic lead to form lead chloride, resulting in loss of metallic lead. For example, at 800° C. and above, this side reaction is quite noticeable as evidenced by the formation of a significant layer of molten lead chloride on top of the molten body of metallic lead. Ordinarily, it is preferred to carry out the process at a temperature of from about 375° C. to about 475° C.

Dross, which has been separated from the lead prior to treatment of the lead by this process, may be separately treated with hydrogen chloride or ammonium chloride by the process of this invention but, in that case, it will usually be preferable to employ temperatures in the range of about 450° C. to about 650° C. to aid in obtaining more intimate contact. In a representative experiment using hydrogen chloride under those conditions, the sulfur content of the dross has been substantially completely removed.

Usually, it will be most convenient and preferable to use gaseous hydrogen chloride as such in the process. However, quite satisfactory results can be obtained by the use of ammonium chloride which readily reacts with the impurities and/or dissociates to yield hydrogen chloride at the temperature at which the process is to be conducted, and such compound may be preferred in some cases.

In the most preferred form of the invention, gaseous hydrogen chloride is introduced near the bottom of the body of molten lead through one or more efficient gas spargers, whereby it enters the molten lead as streams of fine bubbles. Ordinarily, the hydrogen chloride will be at about atmospheric temperature, but it may be preheated in order to aid in maintaining the lead at the desired temperature. This may be done in the molds into which the molten lead is cast, in the melt pot in which the lead is melted for preparation of lead-sodium alloy, or in other conventional apparatus.

When ammonium chloride is used, it may be added to and mixed with the lead or the hot lead may be added to the ammonium chloride contained in a suitable vessel, preferably in the molds into which the molten lead is cast.

The process is usually carried out at about atmospheric pressure. However, higher and lower pressures can be used if desired, avoiding pressures which prevent the escape of the gaseous reaction products from the lead. Also, if desired, an atmosphere of an inert noninflammable gas, such as nitrogen or combustion gases, may be maintained above the body of hot lead, but usually is not necessary.

Since the quantity of the impurities in the lead is quite small, the speed and efficiency of the reaction depends to a large extent on the intimacy of contact of the hydrogen chloride therewith, i. e. the extent of the dispersion of the hydrogen chloride throughout the body of lead. The introduction of gaseous hydrogen chloride as streams of fine bubbles, as through efficient gas spargers, aids materially in obtaining intimate contact. When molten lead is added to ammonium chloride, the vaporization or dissociation thereof to form gaseous products provides agitation of the molten lead to produce fairly intimate contact which, in some cases, may be sufficient for the purposes of this invention. However, in all cases, it is usually desirable and much preferred to subject the body of lead to vigorous mechanical agitation during the reaction.

The quantity of hydrogen chloride or ammonium chloride that will be employed will depend upon the amount of the impurities in the lead, the efficiency of the reaction, and the extent to which it is desired to reduce the level of sulfur compounds in the lead. When gaseous hydrogen chloride is employed, it will be passed through the molten lead until the amount of the sulfur compounds in the lead is reduced to the desired extent, preferably to substantially nil values. Normally, substantially complete removal of the sulfur from the impurities in the lead is accomplished with a quantity of hydrogen chloride or ammonium chloride equal to at least about 5 times that theoretically required to convert all of the sulfur compounds (calculated as lead sulfide) in the lead to the chlorides, i. e. the sulfur therein to hydrogen sulfide. Quantities of hydrogen chloride or ammonium chloride up to about 50 times that theoretically required may be employed practically. Larger quantities are merely wasteful and uneconomical. Preferably, for practical maximum removal of the sulfur, the quantities of hydrogen chloride or ammonium chloride employed will be from about 6 to about 8 times that theoretically required for the conversion of sulfur to hydrogen sulfide. Based on the quantity of lead to be processed, containing an average of about 0.075% of sulfur compounds calculated as lead sulfide, from about 0.5 to about 30 pounds of reagent calculated as hydrogen chloride may be employed for each ton (2,000 lbs.) of lead, and preferably at least about 3 pounds per ton which corresponds to about six times the theoretical amount. When ammonium chloride is employed, the corresponding calculated amount thereof will be added to the lead or to the vessel to which the molten lead is to be added.

The course of the reaction is most readily followed by monitoring the off gases leaving the surface of the lead for the presence of hydrogen sulfide. Almost immediately upon introducing a stream of hydrogen chloride gas into the body of lead at about 330° C. and above, hydrogen sulfide appears in the off gases above the lead and may be detected qualitatively by means of lead acetate test papers. The reaction is substantially complete, i. e. the sulfur of the sulfur compounds (as well as the oxides and carbonates) in the lead is reduced to a negligible and innocuous level when this test for hydrogen sulfide is negative. The presence and the amounts of the sulfur compounds can also be determined by standard methods of analysis on samples of the lead.

Usually, an insoluble dross will form on the surface of the molten lead. This dross, formed in the course of the process, contains substantially no or greatly reduced amounts of sulfur compounds over that formed in the absence of hydrogen chloride. Such dross, formed during the process of this invention, has a sufficiently low sulfide content that it can be combined economically with the impure sludge that is to be treated in the reverberatory furnace where some of its impurities, including most of the metal chlorides, will be removed in the slag.

The metallic lead, obtained by the process of this invention, is particularly useful for direct conversion (without further refining) into lead-sodium alloy which is to be used in the manufacture of tetraethyllead. The hydrogen chloride and the ammonium chloride and its decomposition products employed or produced under the conditions of this process do not appear to have any undesirable effects on the metallic lead, there being no harmful effects attending the use of the treated lead in the manufacture of lead-sodium alloy and the use thereof in the manufacture of tetraethyllead. Instead, definite benefits are realized. The so-treated lead requires less sodium than untreated conventionally recovered lead in producing a satisfactory lead-sodium alloy; requiring about 10.02 to 10.00% of sodium, which is more nearly the theoretical 10.00%, and the resultant average savings of 0.02% to 0.04% in sodium consumption is considerable in large scale commercial operations. It has been demonstrated many times in the laboratory that lead-sodium alloy, prepared from the so-treated lead, has produced yields of tetraethyllead about 0.5% to 2.5% greater than that from conventionally recovered lead which had not been treated by the process of this invention. In addition, the dross, obtained in the process, is so different in character from that otherwise obtained that it can be returned to the reverberatory furnace for processing with impure lead sludge to recover its lead values; the dross obtained by the prior conventional processes not being of that character but requiring separate treatment by a different refining process.

In order to more clearly illustrate this invention, preferred modes of practicing it, and the advantageous results to be obtained thereby, the following examples are given in which the lead employed had been recovered from conventional reaction masses produced in the commercial manufacture of tetraethyllead by distillation of the unreacted ethyl chloride; followed by steam distillation in the presence of ferric chloride-sodium thiosulfate still aid; separation, washing and drying of the lead sludge; heating of the dried impure lead in a conventional reverberatory furnace at 700-900° C., and tapping the molten lead from the furnace. The samples employed in Examples 1 and 2 were dipped out of the molten mass obtained from the furnace.

*Example 1*

5000 grams of lead, containing as the major impurity 0.075% of sulfide calculated as lead sulfide, was heated to 450° C. and agitated. 50 grams of ammonium chloride (about a 30 fold excess) were added to this molten mass and the reaction mass held and stirred at 450° C. for one hour, during which time the ammonium chloride apparently dissociated into ammonia and hydrogen chloride, and completely left the reaction mass. Analysis of the thus-treated lead showed a sulfide content of 0.005% (calculated as lead sulfide).

Good results were also obtained when the quantity of ammonium chloride employed was decreased to about 13 grams.

*Example 2*

1037 grams of lead, containing 0.940 gram of sulfides calculated as lead sulfide (0.09%), was melted in a steel pot equipped with an agitator and a gas inlet tube having a gas-sparging tip and extending to a point near the bottom of the reactor. Into this body of molten lead, maintained under agitation and at a temperature of 454–465° C., hydrogen chloride was introduced as fine streams of bubbles, through the gas inlet tube. After 2.03 grams of hydrogen chloride (about a 7.5 fold excess) had been passed through the lead, the lead was sampled and its sulfide content as lead sulfide was determined to be 0.031 gram (0.003%).

*Example 3*

A total of 1,500,000 pounds of molten lead from a series of runs in a reverberatory furnace was run into molds, each mold having a 3600 lb. capacity and each containing 5 lbs. of ammonium chloride (about a 4.5 fold excess) spread evenly over its bottom. In the furnace, the molten lead was at a temperature of about 750° C. but it cooled in the casting operation to temperatures within the range 550–650° C. On being contacted by the hot molten lead in the mold, the ammonium chloride was apparently dissociated into ammonia and hydrogen chloride as evidenced by the vigorous and complete evolution of gas which in passing through the molten lead maintained it in a state of agitation. The molds were allowed to cool and a sample of solid lead taken from each and analyzed for sulfide. The sulfide content of the controls (cast lead from the same charge but not treated with ammonium chloride) was 0.075%; the average sulfide content of the treated test samples was 0.013% calculated as lead sulfide.

The above-purified lead was converted to lead-monosodium alloy (10.02% Na) and ethylated to tetraethyllead by reaction with excess ethyl chloride under standard plant conditions and comparative to normal recovered lead. The yield of tetraethyllead obtained represented a 0.53% increase over the yield of tetraethyllead obtained from "normal" lead-monosodium alloy (10.04% Na) produced from "normal," i. e. untreated recovered lead.

It will be understood that the preceding examples have been given for illustrative purposes solely and that this invention is not limited to the specific embodiments set forth therein. On the other hand, it will be readily apparent to those skilled in the art that, subject to the limitations set forth in the general description, many variations and modifications can be made, particularly in the materials, proportions, conditions and techniques employed without departing from the spirit and scope of this invention.

It is apparent from the preceding description that this invention provides a novel process for treating lead contaminated with small amounts of sulfur compounds to materially reduce the amounts of those contaminants. More particularly, it provides a process for improving the character of the lead recovered in the manufacture of tetraethyllead so that it is more suitable for reuse in that manufacture with important savings in sodium and costs. The process is simple, easy and economical to operate. Accordingly, it is obvious that this invention constitutes a valuable advance in and contribution to the art.

What we claim is:

1. The process for reducing the amount of sulfur compounds in lead which is contaminated with from about 0.05% to about 15% by weight of impurities which consist mainly of lead sulfide, which process comprises maintaining the lead at a temperature of from about 330° C. to about 650° C. while intimately contacting it with a member of the group consisting of hydrogen chloride and ammonium chloride until the hydrogen sulfide content of the off gas becomes substantially nil.

2. The process for reducing the amount of sulfur compounds in lead which is contaminated with from about 0.05% to about 15% by weight of impurities which consist mainly of lead sulfide, which process comprises maintaining the lead at a temperature of from about 330° C. to about 650° C. while intimately contacting it with a member of the group consisting of hydrogen chloride and ammonium chloride in an amount equal to at least about 5 times that theoretically required to convert all of the sulfur compounds therein to chlorides.

3. The process for reducing the amount of sulfur compounds in lead which is contaminated with from about 0.05% to about 15% by weight of impurities which consist mainly of lead sulfide, which process comprises maintaining the lead at a temperature of from about 330° C. to about 650° C. and subjecting it to vigorous agitation while passing hydrogen chloride into it as fine streams of bubbles until the hydrogen sulfide content of the off gas becomes substantially nil.

4. The process for reducing the amount of sulfur compounds in lead which is contaminated with from about 0.05% to about 0.2% by weight of impurities which consist mainly of lead sulfide, which process comprises maintaining the lead at a temperature of from about 375° C. to about 475° C. and subjecting it to vigorous agitation while passing hydrogen chloride into it as fine streams of bubbles until the hydrogen sulfide content of the off gas becomes substantially nil.

5. The process for reducing the amount of sulfur compounds in lead which is contaminated with from about 0.05% to about 15% by weight of impurities which consist mainly of lead sulfide, which process comprises maintaining the lead at a temperature of from about 330° C. to about 650° C. while intimately contacting it with ammonium chloride in an amount in excess of that theoretically required to convert all of the sulfur compounds therein to chlorides.

6. The process for reducing the amount of sulfur compounds in lead which is contaminated with from about 0.05% to about 0.2% by weight of impurities which consist mainly of lead sulfide, which process comprises maintaining the lead at a temperature of from about 375° C. to about 650° C. while intimately contacting it with ammonium chloride in an amount equal to from about 6 to about 8 times that theoretically required to convert all of the sulfur compounds therein to chlorides.

No references cited.